(12) United States Patent
Chen

(10) Patent No.: US 7,178,822 B2
(45) Date of Patent: Feb. 20, 2007

(54) STROLLER FRAME FOLDABLE IN TWO DIRECTIONS

(75) Inventor: Shun-Min Chen, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 257 days.

(21) Appl. No.: 10/926,910

(22) Filed: Aug. 26, 2004

(65) Prior Publication Data

US 2005/0242547 A1 Nov. 3, 2005

(30) Foreign Application Priority Data

Apr. 30, 2004 (CN) .................... 2004 2 0424621

(51) Int. Cl.
*B62B 7/06* (2006.01)
(52) U.S. Cl. ...................... 280/642; 280/647
(58) Field of Classification Search .................. 280/38, 280/39, 42, 638, 639, 642, 647, 650, 657, 280/658
See application file for complete search history.

(56) References Cited

U.S. PATENT DOCUMENTS

| | | | | | |
|---|---|---|---|---|---|
| 4,232,897 A | * | 11/1980 | Maclaren, et al. | ............ | 297/45 |
| 4,618,184 A | * | 10/1986 | Harvey | ......................... | 297/19 |
| 5,288,098 A | * | 2/1994 | Shamie | ....................... | 280/642 |
| 5,979,928 A | * | 11/1999 | Kuo | ........................... | 280/642 |
| 6,206,405 B1 | * | 3/2001 | Watkins | ..................... | 280/647 |
| 6,581,957 B1 | * | 6/2003 | Lan | ............................ | 280/642 |
| 6,843,499 B2 | * | 1/2005 | Guo | ........................... | 280/642 |

* cited by examiner

*Primary Examiner*—Frank Vanaman
(74) *Attorney, Agent, or Firm*—The Webb Law Firm

(57) ABSTRACT

A stroller frame is foldable in two dimensions, and includes front and rear rods, a stretcher interconnecting and pivoted to the rear rods, a locking mechanism for retaining the stretcher at a folded position, a pair of seat rods, each of which is pivoted to an adjacent pair of the front and rear rods, and a pair of crossed linking rods, each of which is pivoted diagonally to a respective one of the front rods and a respective one of the seat rods.

7 Claims, 12 Drawing Sheets

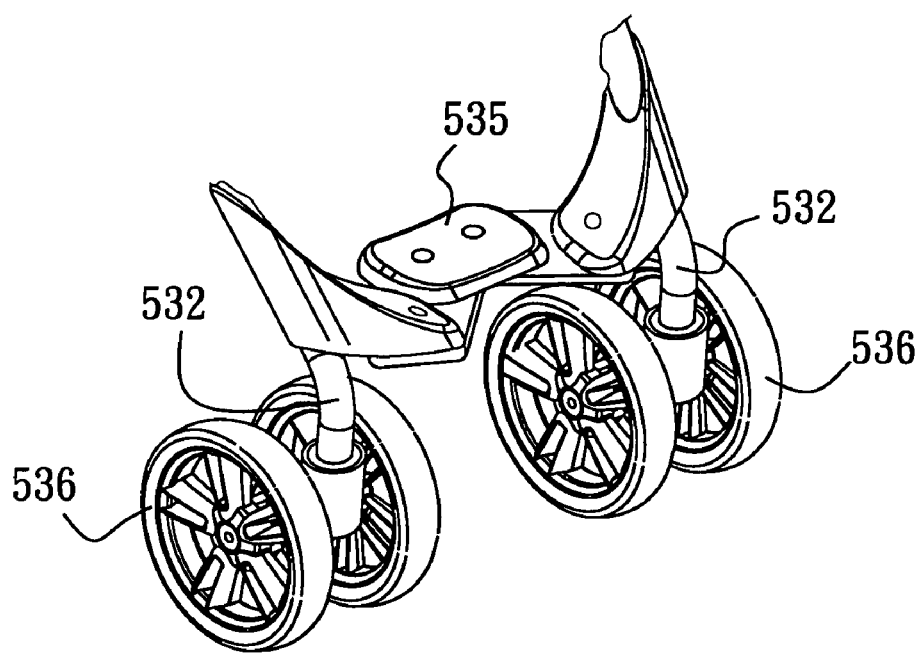
F I G. 4
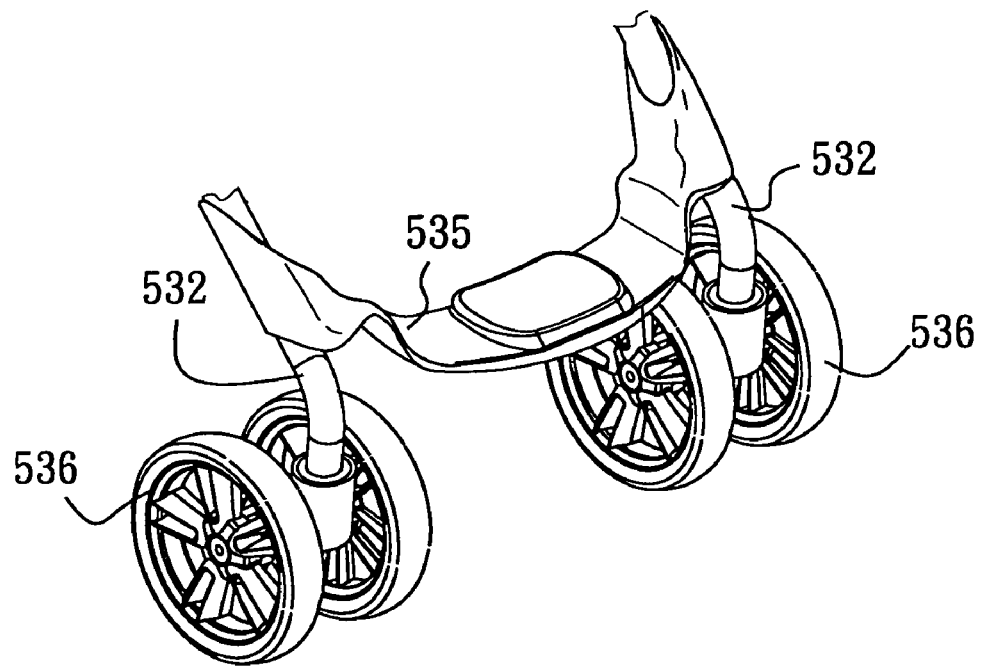
F I G. 5

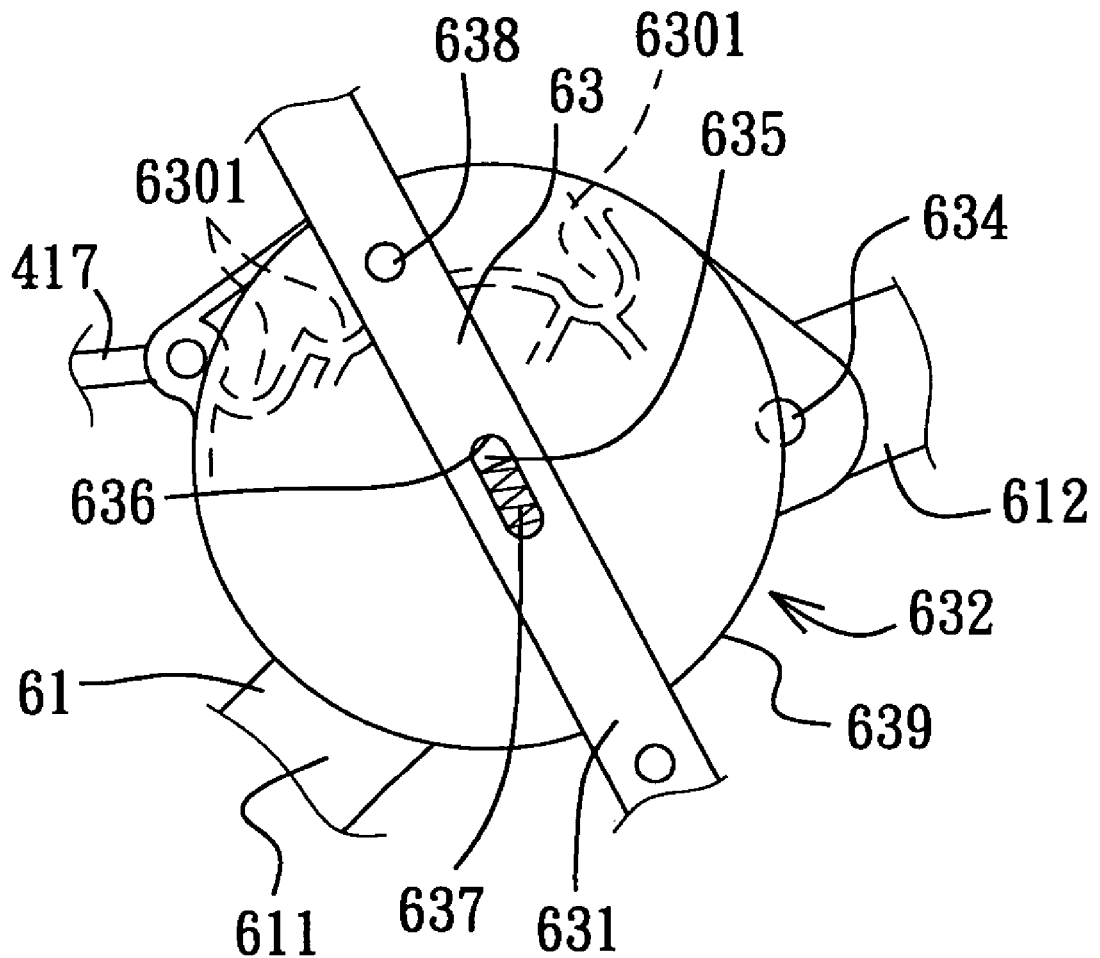
F I G. 7

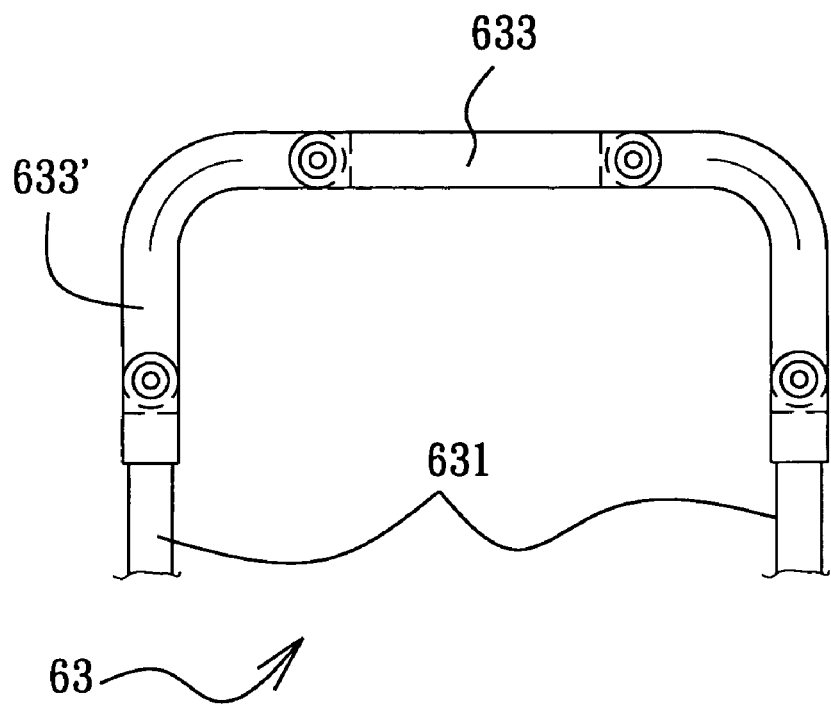
F I G. 8
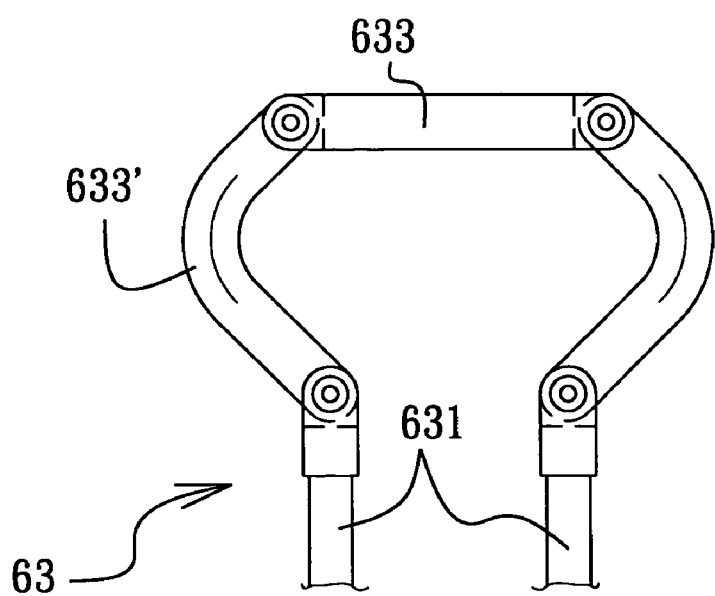
F I G. 9

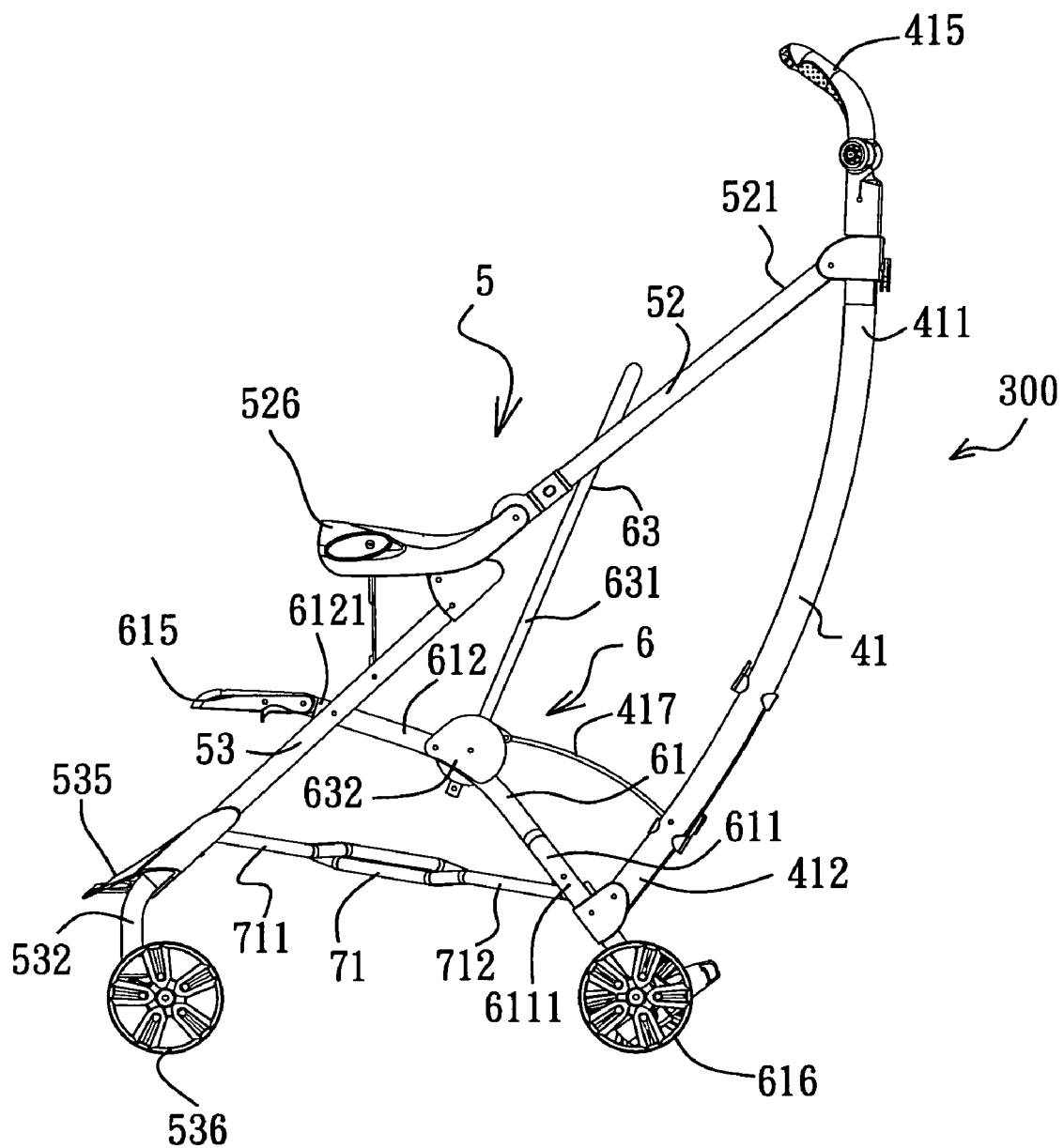
F I G. 10

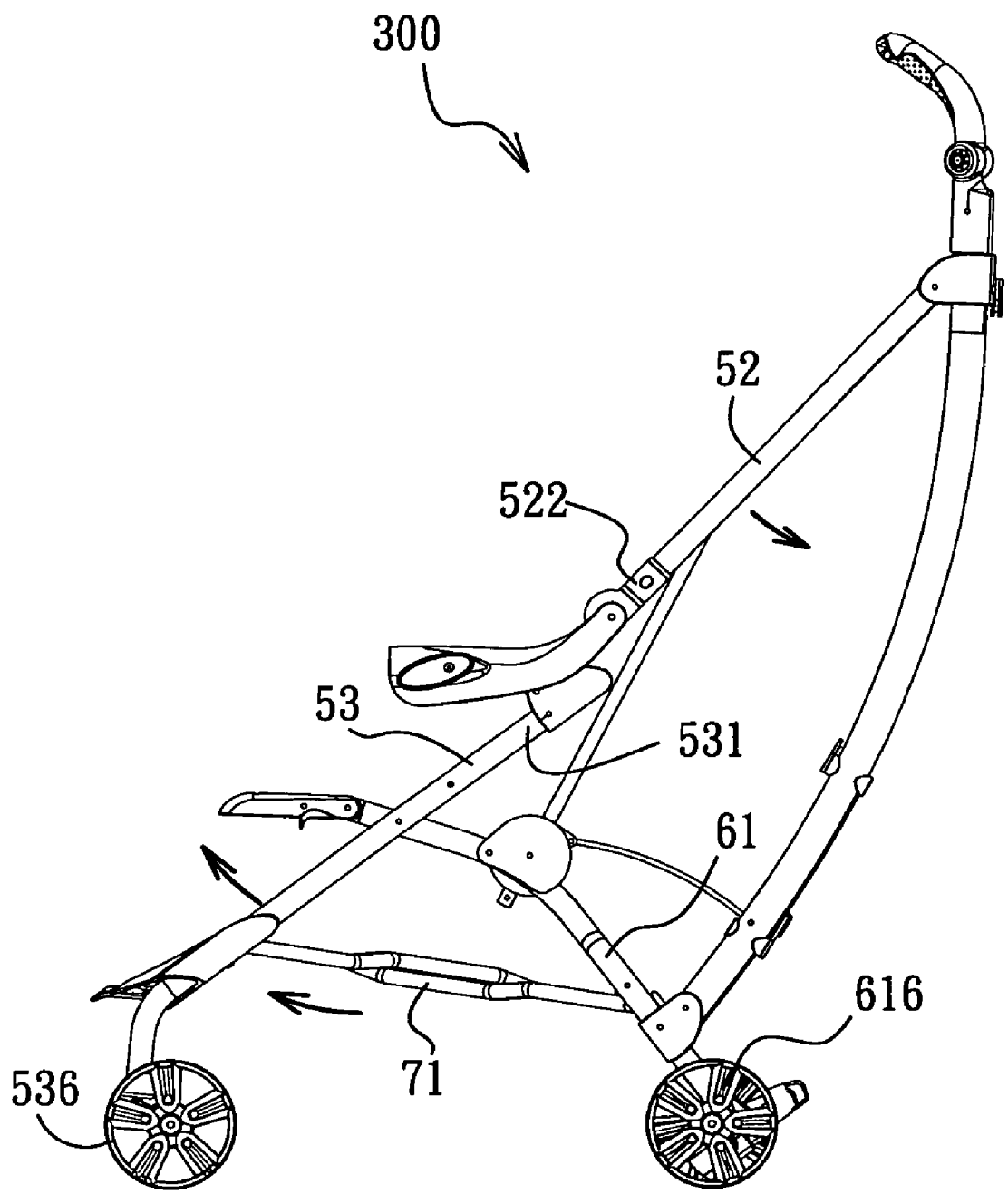
F I G. 13

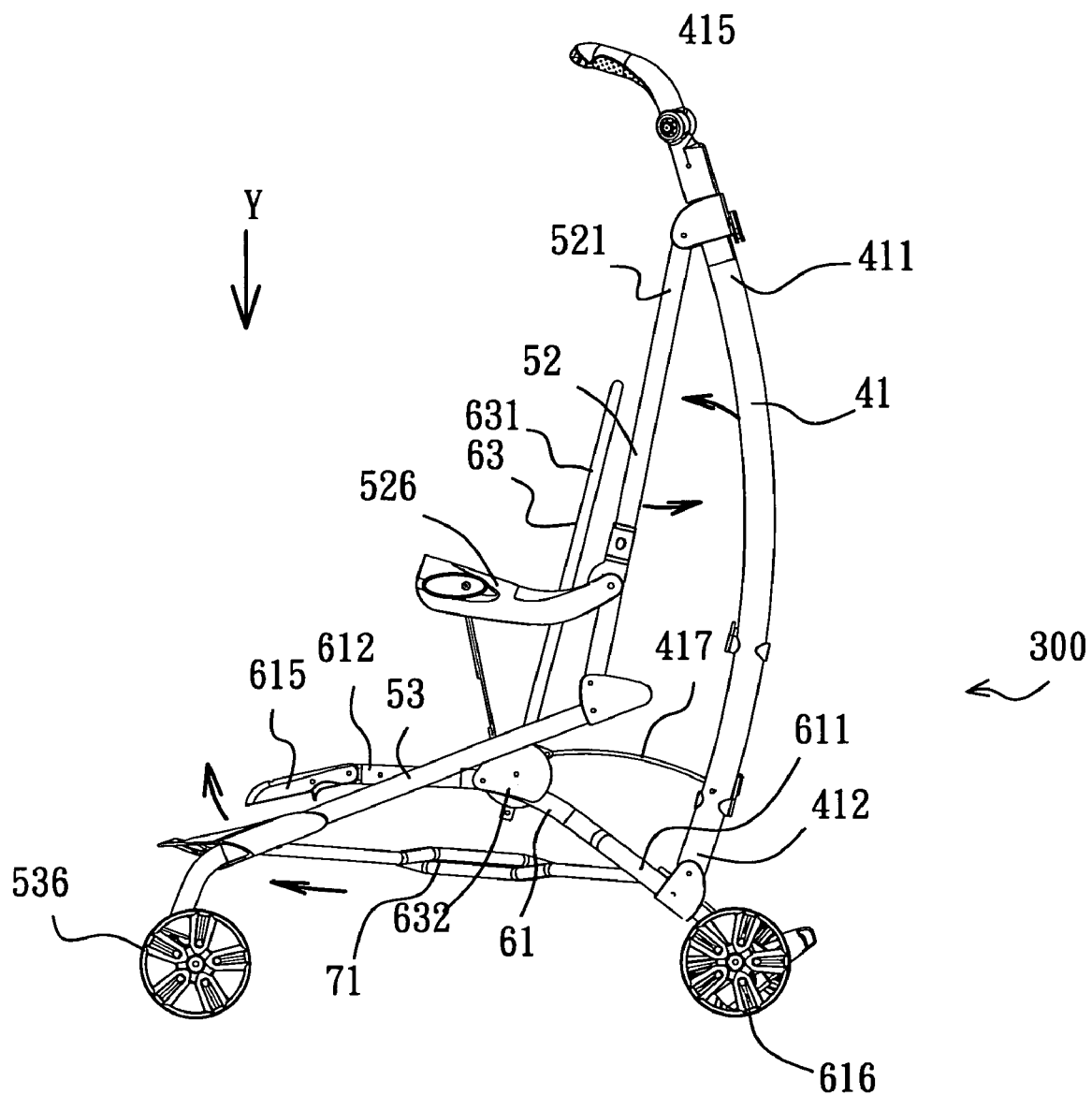
F I G. 14

STROLLER FRAME FOLDABLE IN TWO DIRECTIONS

CROSS-REFERENCE TO RELATED APPLICATION

This application claims priority of Chinese Application No. 2004200424621, filed on Apr. 30, 2004.

BACKGROUND OF THE INVENTION

1. Field of the Invention

This invention relates to a foldable stroller frame, more particularly to a stroller frame that is foldable in two dimensions.

2. Description of the Related Art

Conventional foldable stroller frames normally provide linking mechanisms connected to front and rear legs of the stroller frames so as to permit folding of the front and rear legs. In the conventional stroller frames, the front and rear legs are normally foldable in a first direction toward each other. In addition, each of the front legs may include upper and lower segments that are pivoted to each other so that they are further foldable in a second direction toward each other. However, the conventional foldable stroller frames cannot be folded simultaneously in the first and second directions when only an external force is applied to the front legs or the rear legs in only one of the first and second directions.

SUMMARY OF THE INVENTION

The object of the present invention is to provide a stroller frame that is foldable is two dimensions and that is capable of overcoming the aforesaid drawback associated with the prior art.

According to this invention, there is provided a stroller frame that comprises: a pair of opposing rear rods, each of which has opposite top and bottom end portions; a foldable stretcher interconnecting the rear rods and foldable in a first direction from a first unfolded position, in which the rear rods are distal from each other, to a first folded position, in which the rear rods are proximate to each other; a pair of front rods, each of which has upper and lower segments with top and bottom end portions, the top end portion of the upper segment of each of the front rods being pivoted to the top end portion of a respective one of the rear rods, the bottom end portion of the upper segment being pivoted to the top end portion of the lower segment so as to permit folding of each of the front rods in a second direction from a second unfolded position, in which the bottom end portion of the lower segment is distal from the top end portion of the upper segment, to a second folded position, in which the bottom end portion of the lower segment is proximate to the top end portion of the upper segment; a pair of opposing bent seat rods, each of which has a rear rising segment that has a bottom end portion pivoted to the bottom end portion of a respective one of the rear rods and that extends upwardly and frontwardly from the bottom end portion thereof, and a front lateral segment that extends laterally and frontwardly from the rear rising segment and that has a front end portion pivoted to the lower segment of a respective one of the front rods at a position between the top and bottom end portions of the lower segment of the respective one of the front rods; and a pair of crossed linking rods, each of which is disposed in a diagonal position with respect to the front and rear rods, and each of which has a front end portion that is pivoted to the bottom end portion of the lower segment of a respective one of the front rods, and a rear end portion that is opposite to the front end portion thereof and that is pivoted to one of the bottom end portion of a respective one of the rear rods and the bottom end portion of the rear rising segment of a respective one of the seat rods so as to permit simultaneous folding of the front rods in the first and second directions upon movement of the rear rods toward each other.

BRIEF DESCRIPTION OF THE DRAWINGS

Other features and advantages of the present invention will become apparent in the following detailed description of the preferred embodiment of the invention, with reference to the accompanying drawings, in which:

FIG. 4 is a fragmentary perspective view to illustrate a footrest of the preferred embodiment;

FIG. 5 is a fragmentary perspective view to illustrate a modified footrest of the preferred embodiment;

FIG. 7 is a fragmentary side view to illustrate how the backrest engages a selected one of retaining grooves in a retaining member of the backrest adjusting unit of FIG. 6;

FIG. 8 is a fragmentary schematic view of a modified backrest of the preferred embodiment in an unfolded state;

FIG. 9 is a fragmentary schematic view of the modified backrest of FIG. 8 in a folded state;

FIG. 10 is a schematic side view of the preferred embodiment in an unfolded state;

FIG. 13 is a fragmentary schematic side view to illustrate how the stroller frame of the preferred embodiment is folded when the rear rods are moved in the first direction;

FIG. 14 is a schematic side view to illustrate how the stroller frame of the preferred embodiment is folded when the rear rods are further moved in a second direction.

DETAILED DESCRIPTION OF THE PREFERRED EMBODIMENT

Figure 1:
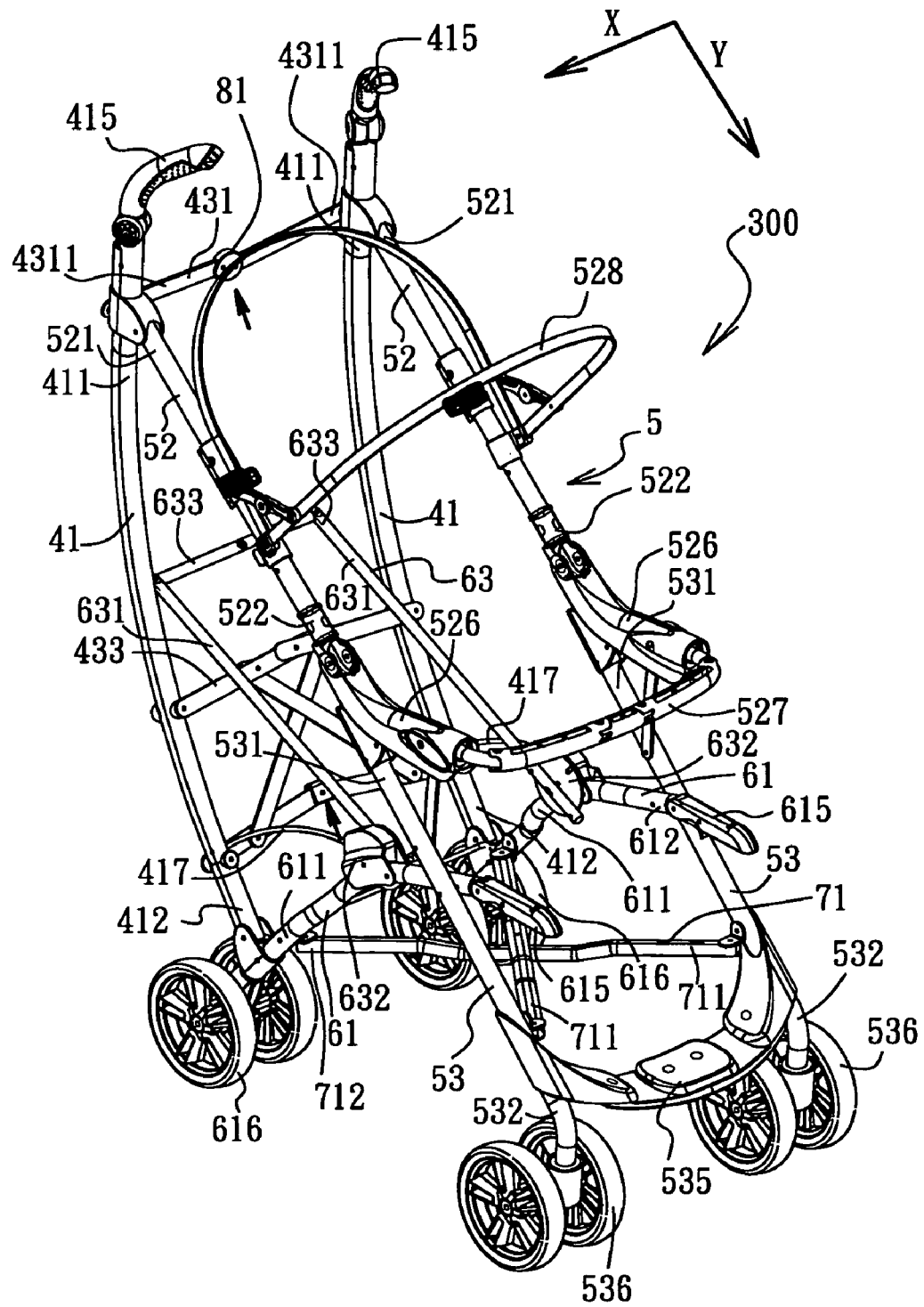
FIG. 1 is a perspective view of the preferred embodiment of a stroller frame that is foldable in two dimensions according to this invention.

FIG. 1 illustrates the preferred embodiment of a stroller frame 300 that is foldable in two dimensions according to the present invention.

Figure 11:
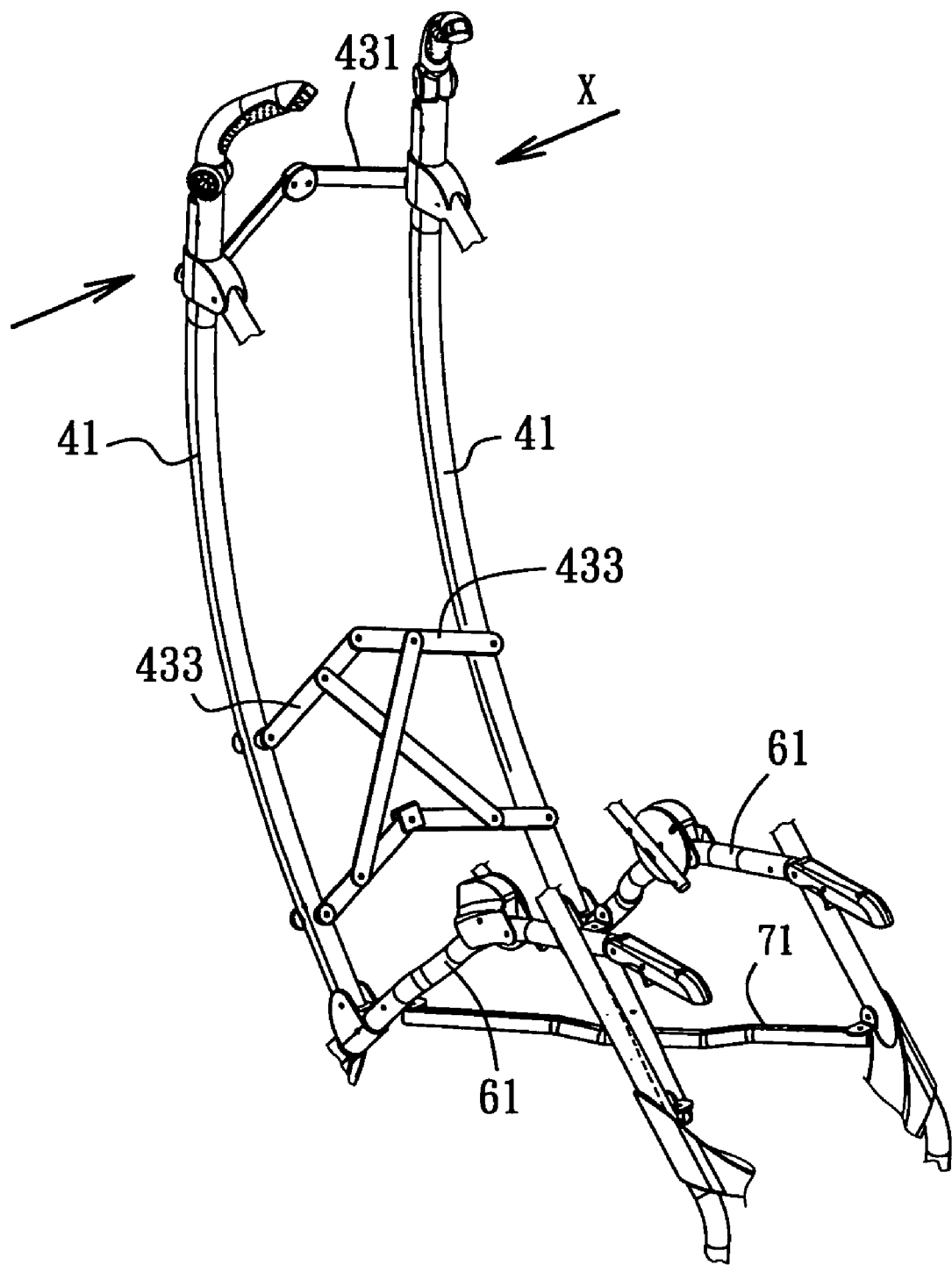
FIG. 11 is a fragmentary schematic view to illustrate how the stroller frame of the preferred embodiment is folded when a pair of rear rods are moved in a first direction.
Figure 12:
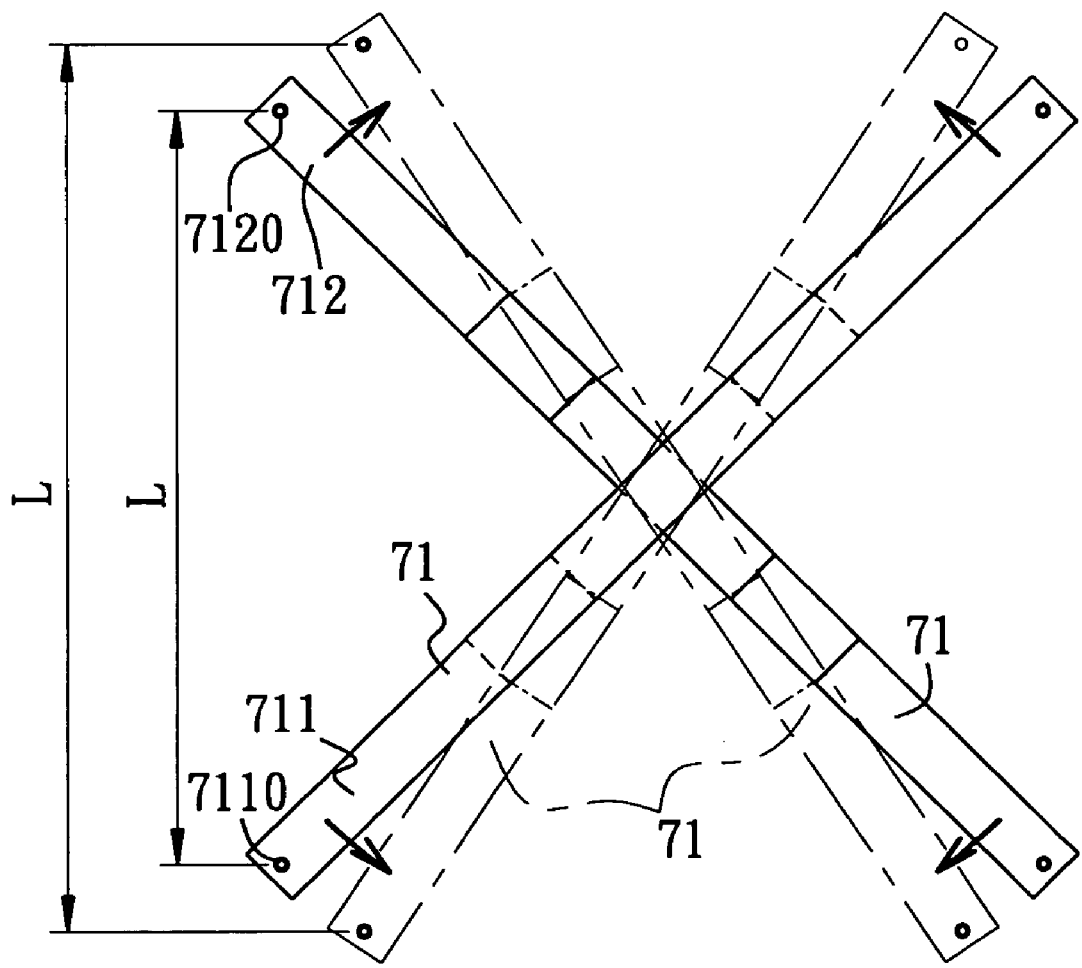
FIG. 12 is a schematic view to illustrate how a pair of linking rods of the preferred embodiment are moved when the rear rods are moved in the first direction.
Figure 15:
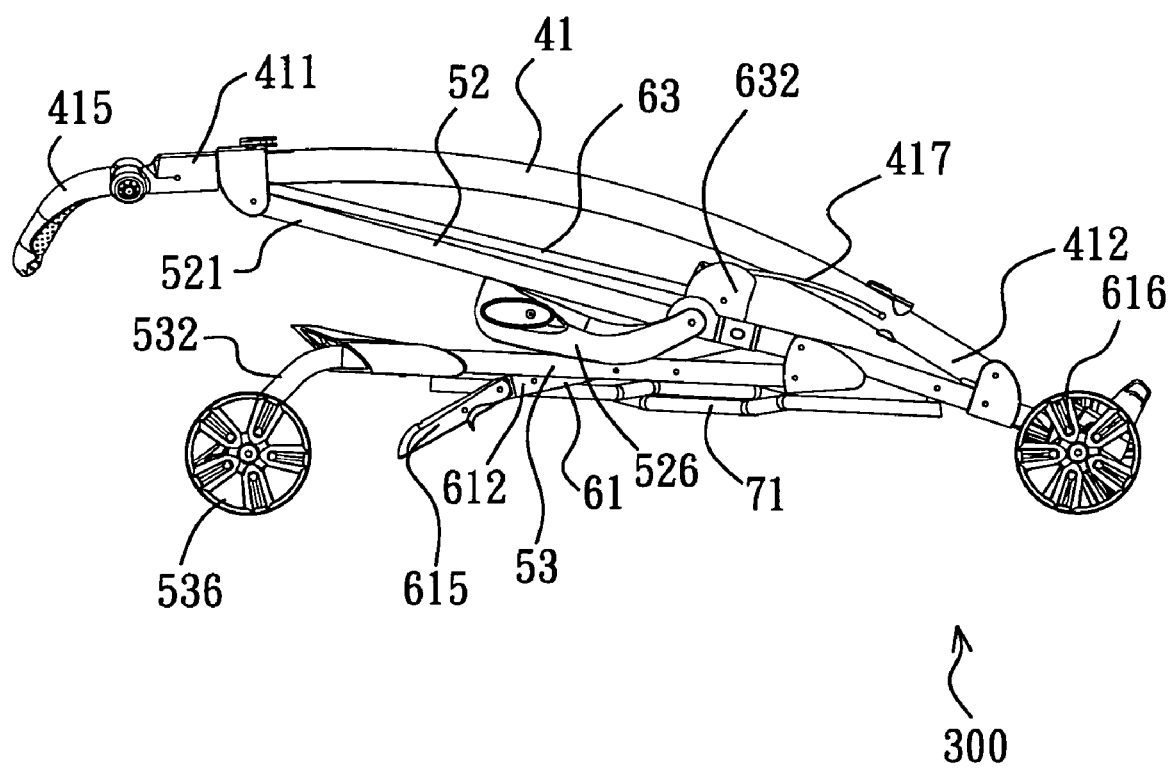
FIG. 15 is a schematic side view to illustrate the preferred embodiment in a completely folded state.

The stroller frame 300 includes: a pair of opposing rear rods 41, each of which has opposite top and bottom end portions 411, 412; a foldable first stretcher 431 interconnecting the rear rods 41 and foldable in a first direction (X) from a first unfolded position (see FIGS. 1 and 10), in which the rear rods 41 are distal from each other, to a first folded position (not shown), in which the rear rods 41 are proximate to each other; a first locking mechanism 81 associated with the first stretcher 431 for retaining releasably the first stretcher 431 at the first unfolded position; a pair of front rods 5, each of which has upper and lower segments 52, 53 with top and bottom end portions 521, 522 (531, 532), the top end portion 521 of the upper segment 52 of each of the front rods 5 being pivoted to the top end portion 411 of a respective one of the rear rods 41, the bottom end portion 522 of the upper segment 52 being pivoted to the top end portion 531 of the lower segment 53 so as to permit folding of each of the front rods 5 in a second direction (Y) from a second unfolded position (see FIGS. 1 and 10), in which the bottom end portion 532 of the lower segment 53 is distal from the top end portion 521 of the upper segment 52, to a second folded position (see FIG. 15), in which the bottom end portion 532 of the lower segment 53 is proximate to the top end portion 521 of the upper segment 52; a pair of opposing bent seat rods 61, each of which has a rear rising segment 611 (see FIG. 10) that has a bottom end portion 6111 pivoted to the bottom end portion 412 of a respective one of the rear rods 41 and that extends upwardly and frontwardly from the bottom end portion 6111 thereof, and a front lateral segment 612 that is bent and that extends laterally and frontwardly from the rear rising segment 611 and that has a front end portion 6121 pivoted to the lower segment 53 of a respective one of the front rods 5 at a position between the top and bottom end portions 531, 532 of the lower segment 53 of the respective one of the front rods 5; and a pair of crossed linking rods 71 (see FIGS. 1, 10 and 12), each of which is disposed in a diagonal position with respect to the front and rear rods 5, 41, and each of which has a front end portion 711 that is pivoted to the bottom end portion 532 of the lower segment 53 of a respective one of the front rods 5, and a rear end portion 712 that is opposite to the front end portion 711 thereof and that is pivoted to one of the bottom end portion 412 of a respective one of the rear rods 41 and the bottom end portion 6111 of the rear rising segment 611 of a respective one of the seat rods 61 so as to permit simultaneous folding of the front rods 5 in the first and second directions (X,Y) upon movement of the rear rods 41 toward each other. FIG. 10 illustrates the stroller frame 300 in an unfolded state. FIGS. 11 to 13 illustrate how the stroller frame 300 is folded from the unfolded state when the rear rods 41 are moved in the first direction (X). As best illustrated in FIG. 12, the linking rods 71 are moved together with the rear rods 41 in the first direction (X), which results in an increase in the distance (L) between a rear end 7120 of the rear end portion 712 of one of the linking rods 71 and a front end 7110 of the front end portion 711 of the other of the linking rods 71, which, in turn, results in pivoting of the upper and lower segments 53, 52 of the front rods 5 relative to each other (see the arrows shown in FIG. 13). FIG. 14 illustrates how the stroller frame 300 is further folded when the rear rods 41 are further moved in the second direction (Y).

In this embodiment, the rear end portion 712 of each of the linking rods 71 is pivoted to the bottom end portion 6111 of the rear rising segment 611 of the respective one of the seat rods 61.

Front and rear wheels 536, 616 are provided respectively on the bottom end portions 6111 of the rear rising segments 611 of the seat rods 61 and the bottom end portions 532 of the lower segments 53 of the front rods 5.

In this embodiment, the stroller frame 300 further includes: a pair of opposing pivot seats 632, each of which is pivoted to the front lateral segment 612 of a respective one of the seat rods 61 through a pivot pin 634 (see FIG. 6) at a position adjacent to the rear rising segment 611 so as to be pivotable relative to the seat rods 61; a pair of opposing pushing levers 417, each of which has front and rear ends that are pivoted respectively to a respective one of the pivot seats 632 and a respective one of the rear rods 41 so as to push each of the pivot seats 632 to pivot frontwardly relative to the seat rods 61; and a backrest 63 connected to and extending upwardly and inclinedly from the pivot seats 632 so as to be co-pivotable with the pivot seats 632 relative to the seat rods 61.

Figure 6:
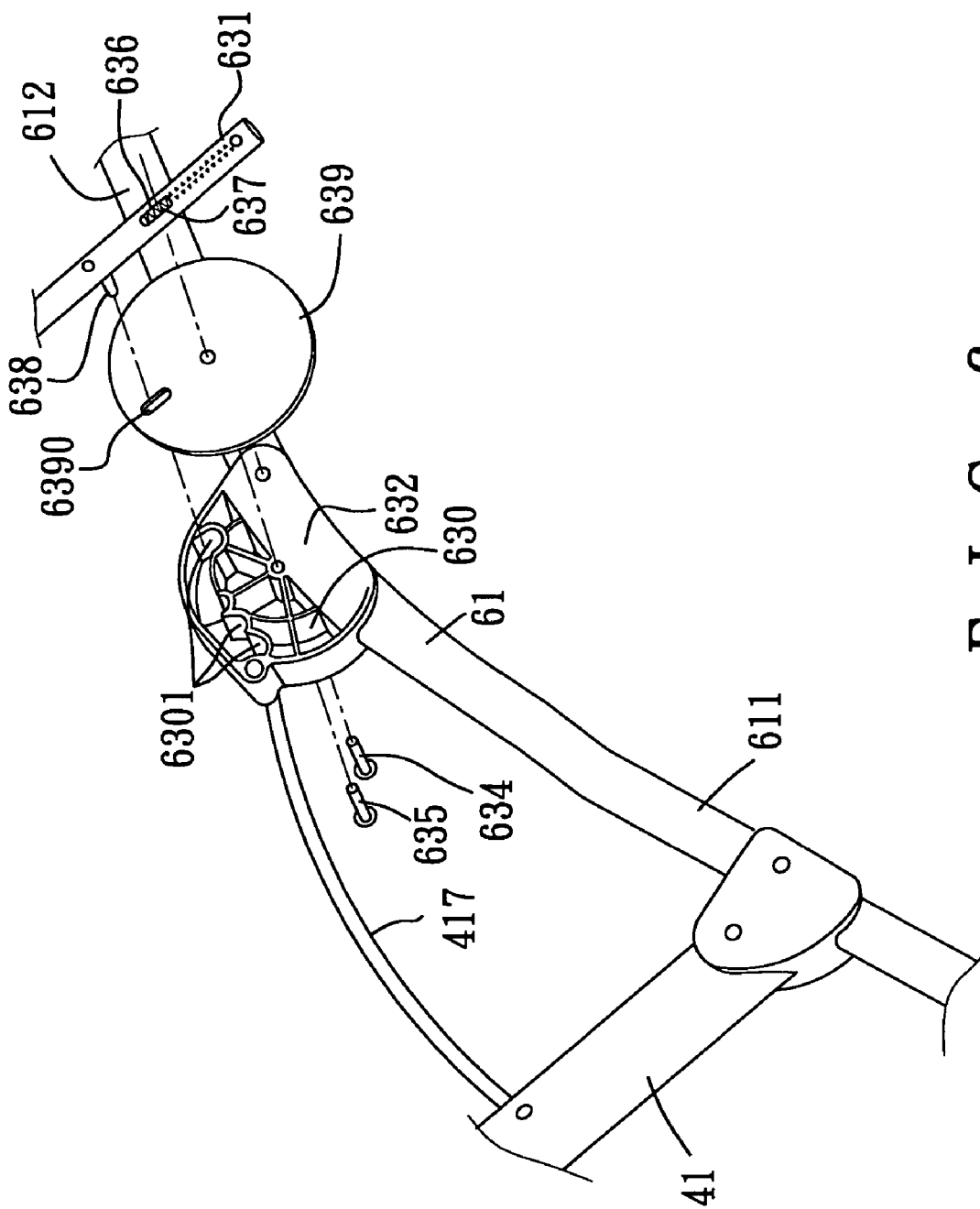
FIG. 6 is a fragmentary exploded perspective view to illustrate how a backrest is adjusted through a backrest adjusting unit of the preferred embodiment.

The backrest 63 includes two opposing side tubes 631, each of which extends upwardly and inclinedly from the respective one of the pivot seats 632 and each of which is formed with an elongated slot 636 (see FIGS. 6 and 7). As best shown in FIGS. 6 and 7, a backrest adjusting unit includes: a pair of connecting pins 635, each of which extends through a respective one of the pivot seats 632 and the slot 636 in the respective one of the side tubes 631 so as to permit mounting of the backrest 63 on the pivot seats 632 and so as to permit movement of the backrest 63 relative to the pivot seats 632 along the length of the slots 636 between locking and unlocking positions; a pair of retaining members 630, each of which is formed on a respective one of the pivot seats 632 and each of which is formed with a plurality of aligned retaining grooves 6301; a pair of locking pins 638, each of which is secured to and projects outwardly from a respective one of the side tubes 631 into a selected one of the retaining grooves 6301 in a respective one of the retaining members 630 when the backrest 63 is disposed at the locking position so as to prevent undesired movement of the backrest 63 relative to the pivot seats 632; and a pair of urging members 637 mounted respectively in the side tubes 631 and abutting respectively against the connecting pins 635 50 as to accumulate a restoring force, which restores or urges the backrest 63 to move from the unlocking position to the locking position, when the locking pins 638 are moved upwardly and outwardly of the selected ones of the retaining grooves 6301. Each of the pivot seats 632 has a cover 639 formed with a cover slot 6390 that is aligned with the selected one of the retaining grooves 6301 for passage of the respective one of the locking pins 638 therethrough.

With the inclusion of the backrest adjusting unit in the stroller frame 300, the inclining angle of the backrest 63 relative to the seat rods 61 can be adjusted. The backrest 63 further includes two lateral tubes 633 that are pivoted to each other and that are pivoted respectively to the top ends of the side tubes 631 of the backrest 63 so as to permit folding of the backrest 63 in the first direction (X) upon movement of the rear rods 41 toward each other. Alternatively, the side tubes 631 of the backrest 63 can be connected to each other through a flexible element (not shown) so as to be movable toward each other and so as to be foldable upon movement of the rear rods 41 toward each other. FIG. 8 illustrates a modified backrest 63 in an unfolded state. The backrest 63 includes a lateral bar 633 and a pair of generally L-shaped connecting elements 633' that are respectively pivoted to two opposite ends of the lateral bar 633 and that are respectively pivoted to the top ends of the side tubes 631 so as to permit the backrest 63 to be foldable to a folded state as shown in FIG. 9.

The first stretcher 431 includes two elongated linking plates 4311 that are pivoted to each other and that are pivoted respectively to the rear rods 41. The linking plates 4311 form substantially a line when the first stretcher 431 is disposed at the first unfolded position.

Figure 3:
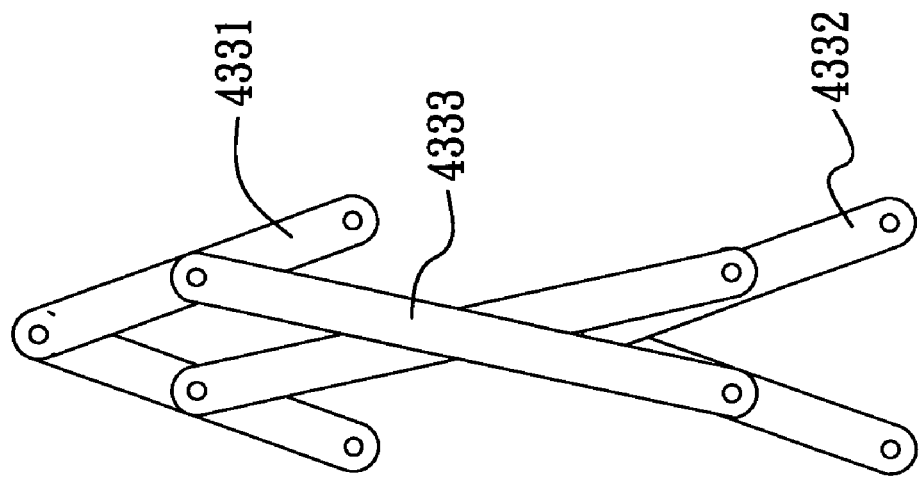
FIG. 3 is a side view to illustrate the stretcher of FIG. 2 in a folded state.
Figure 2:
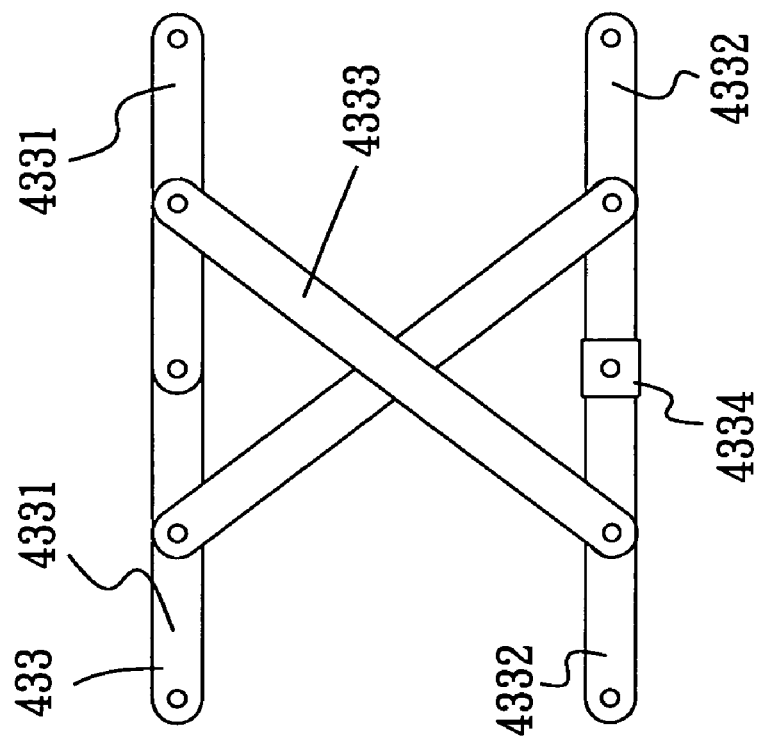
FIG. 2 is a side view to illustrate an unfolded state of a stretcher of the preferred embodiment.

A foldable second stretcher 433 is disposed below the first stretcher 431 (see FIGS. 1 to 3), and includes two upper linking plates 4331 which are pivoted to each other and which are pivoted respectively to the rear rods 41, two lower linking plates 4332 which are disposed below the upper linking plates 4331, which are pivoted to each other, and which are pivoted respectively to the rear rods 41, and a pair of crossed middle linking plates 4333, each of which is pivoted to a respective one of the upper linking plates 4331 and a respective one of the lower linking plates 4332 so as to permit folding of the second stretcher 433 in the first direction (X) between a third folded position (see FIG. 2) and a third unfolded position (see FIG. 3). A second locking mechanism 4334 is associated with the lower linking plates 4332 for retaining releasably the second stretcher 433 at the third unfolded position.

The stroller frame 300 further includes a pair of armrests 526 connected respectively to the upper segments 52 of the front rods 5, a foldable stopper 527 interconnecting the armrests 526, a canopy frame 528 mounted on the upper segments 52 of the front rods 5, a pair of hand grips 415 connected respectively to the top end portions 411 of the rear rods 41, a pair of extension rods 615 pivoted respectively to the front lateral segments 612 of the seat rods 61 so as to be pivotable relative to the seat rods 61 to different angles for raising or lowering the user's legs, and a foldable footrest 535 (see FIGS. 1 and 4) mounted on the lower segments 53 of the front rods 5. In this embodiment, the footrest 535 includes a linking mechanism in order to permit folding of the footrest 535. FIG. 5 illustrates a modified footrest 535 that can be used for replacing the footrest 535 shown in FIG. 4, and that is made from a flexible band.

When the stroller frame 300 is to be folded, the first locking mechanism 81 on the first stretcher 431 and the second locking mechanism 4334 on the second stretcher 433 are unlocked so as to permit folding of the stroller frame 300. In the folding operation, the rear rods 41 are moved toward each other (see FIG. 11), which results in movement of the front rods 5 toward each other and movement of the seat rods 61 toward each other, which, in turn, results in folding of the stopper 527, the footrest 535, the backrest 63, and the linking rods 71 (see FIGS. 11 and 12). When the linking rods 71 is folded, the distance (L) between the rear end 7120 of the rear end portion 712 of one of the linking rods 71 and the front end 7110 of the front end portion 711 of the other of the linking rods 71 is increased, which results in movement of the bottom end portions 522 of the upper segments 52 and the top end portions 531 of the lower segments 53 of the front rods 5 and the seat rods 61 toward the rear rods 41 (see FIGS. 13 and 14), thereby enabling folding of the stroller frame 300 to a folding position (see FIG. 15). Note that the push levers 417 are moved frontwardly during the folding operation of the stroller frame 300, which results in pivoting movement of the pivot seats 632 frontwardly, which, in turn, results in frontward movement of the backrest 63.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A stroller frame foldable in two dimensions, comprising:
    a pair of opposing rear rods, each of which has opposite top and bottom end portions;
    a foldable first stretcher interconnecting said rear rods and foldable in a first direction from a first unfolded position, in which said rear rods are distal from each other, to a first folded position, in which said rear rods are proximate to each other;
    a pair of front rods, each of which has upper and lower segments with top and bottom end portions, said top end portion of said upper segment of each of said front rods being pivoted to said top end portion of a respective one of said rear rods, said bottom end portion of said upper segment being pivoted to said top end portion of said lower segment so as to permit folding of each of said front rods in a second direction from a second unfolded position, in which said bottom end portion of said lower segment is distal from said top end portion of said upper segment, to a second folded position, in which said bottom end portion of said lower segment is proximate to said top end portion of said upper segment;
    a pair of opposing bent seat rods, each of which has a rear rising segment that has a bottom end portion pivoted to said bottom end portion of a respective one of said rear rods and that extends upwardly and frontwardly from said bottom end portion thereof, and a front lateral segment that extends laterally and frontwardly from said rear rising segment and that has a front end portion pivoted to said lower segment of a respective one of said front rods at a position between said top and bottom end portions of said lower segment of the respective one of said front rods;
    a pair of crossed linking rods, each of which is disposed in a diagonal position with respect to said front and rear rods, and each of which has a front end portion that is pivoted to said bottom end portion of said lower segment of a respective one of said front rods, and a rear end portion that is opposite to said front end portion thereof and that is pivoted to one of said bottom end portion of a respective one of said rear rods and said bottom end portion of said rear rising segment of a respective one of said seat rods so as to permit simultaneous folding of said front rods in said first and second directions upon movement of said rear rods toward each other;
    a pair of opposing pivot seats, each of which is pivoted to said front lateral segment of a respective one of said seat rods at a position adjacent to said rear rising segment so as to be pivotable relative to said seat rods;
    a pair of opposing pushing levers, each of which has front and rear ends that are pivoted respectively to a respective one of said pivot seats and a respective one of said rear rods so as to push each of said pivot seats to pivot frontwardly relative to said seat rods; and
    a backrest connected to and extending upwardly and inclinedly from said pivot seats so as to be co-pivotable with said pivot seats relative to said seat rods.

2. The stroller frame of claim 1, further comprising a first locking mechanism associated with said first stretcher for retaining releasably said first stretcher at said first unfolded position.

3. The stroller frame of claim 2, wherein said first stretcher includes two elongated linking plates that are pivoted to each other and that are pivoted respectively to said rear rods, said linking plates forming a line when said first stretcher is disposed at said first unfolded position.

4. The stroller frame of claim 3, further comprising a foldable second stretcher that is disposed below said first stretcher and that includes two upper linking plates which are pivoted to each other and which are pivoted respectively to said rear rods, two lower linking plates which are disposed below said upper linking plates, which are pivoted to each other, and which are pivoted respectively to said rear rods, and a pair of crossed middle linking plates, each of which is pivoted to a respective one of said upper linking plates and a respective one of said lower linking plates so as to permit folding of said second stretcher in said first direction between third folded and unfolded positions.

5. The stroller frame of claim 4, further comprising a second locking mechanism associated with said lower linking plates for retaining releasably said second stretcher at said third unfolded position.

6. The stroller frame of claim 1, wherein said backrest includes two opposing side tubes, each of which extends upwardly and inclinedly from a respective one of said pivot seats and each of which is formed with an elongated slot, said stroller frame further comprising a backrest adjusting unit including: a pair of connecting pins, each of which extends through a respective one of said pivot seats and said slot in a respective one of said side tubes so as to permit mounting of said backrest on said pivot seats and so as to permit movement of said backrest relative to said pivot seats along the length of said slots between locking and unlocking positions; a pair of retaining members, each of which is formed on a respective one of said pivot seats and each of which is formed with a plurality of aligned retaining grooves; a pair of locking pins, each of which is secured to and projects outwardly from a respective one of said side tubes into a selected one of said retaining grooves in a respective one of said retaining members when said backrest is disposed at a said locking position so as to prevent undesired movement of said backrest relative to said pivot seats; and a pair of urging members mounted respectively in said side tubes and abutting respectively against said connecting pins for urging said backrest to move from said unlocking position to said locking position when said locking pins are moved upwardly and outwardly of the selected ones of said retaining grooves.

7. The stroller frame of claim 6, wherein said side tubes of said backrest are connected to each other in such a manner that said side tubes are movable toward each other upon movement of said rear rods toward each other.

* * * * *